May 28, 1935.  B. M. LEECE  2,003,001

VOLTAGE REGULATING DEVICE

Filed Jan. 5, 1934

INVENTOR:
BENNETT M. LEECE

Kwis Hudson & Kent
ATTORNEYS

Patented May 28, 1935

2,003,001

UNITED STATES PATENT OFFICE 2,003,001

VOLTAGE REGULATING DEVICE

Bennett M. Leece, Cleveland, Ohio, assignor to The Leece-Neville Company, Cleveland, Ohio, a corporation of Ohio Application January 5, 1934, Serial No. 705,409

7 Claims. (Cl. 171—229)

This invention relates to the regulation of electrical generators, and more particularly to improved means for regulating the voltage of a variable speed variable load generator.

The voltage regulating means of the present application is an improvement over the voltage regulating means of my earlier copending application, Serial No. 680,929, filed July 18, 1933.

An object of the present invention is to provide improved generator regulating means, wherein an auxiliary coil is energized in magnetically opposed relation to the main field of the generator, and wherein a vibratory contact device is energized from the generator and operates to vary the ampere turns of the main field, such vibratory contact device having a plurality of magnet coils, one of which is in series with the auxiliary field winding, and another of which has circuit connections adapted to be altered by the operation of the vibratory contact device.

Another object of the invention is to provide novel regulation for a variable speed generator, wherein an auxiliary coil is energized in magnetically opposed relation to the main field, and wherein a vibratory contact device having a plurality of magnet coils energized from the generator including a coil in series with the auxiliary field winding also has a resistance which is common to the main field circuit and to the circuit of another of the magnet coils, and circuit connections for intermittently short-circuiting such resistance to thereby vary the ampere-turns of the main field and of such other magnet coil.

Still another object of the invention is to provide novel regulation for a variable speed generator, wherein an auxiliary coil is energized in magnetically opposed relation to the main field, and wherein a vibratory contact device having a plurality of magnet coils energized from the generator including a coil in series with the auxiliary field winding, also has circuit connections controlled by the vibratory means for varying the ampere turns of the main field and of another of the magnet coils of the device.

A further object of this invention is to provide generator regulating means, of the type referred to, wherein one of the magnet coils of the vibratory contact device is in series with the auxiliary bucking field winding, and wherein another of the magnet coils is an inductive resistance in the circuit of the main field which magnetically opposes said series coil of the regulator and which is adapted to be intermittently short-circuited by the vibratory contact means of the device.

Figure 1:
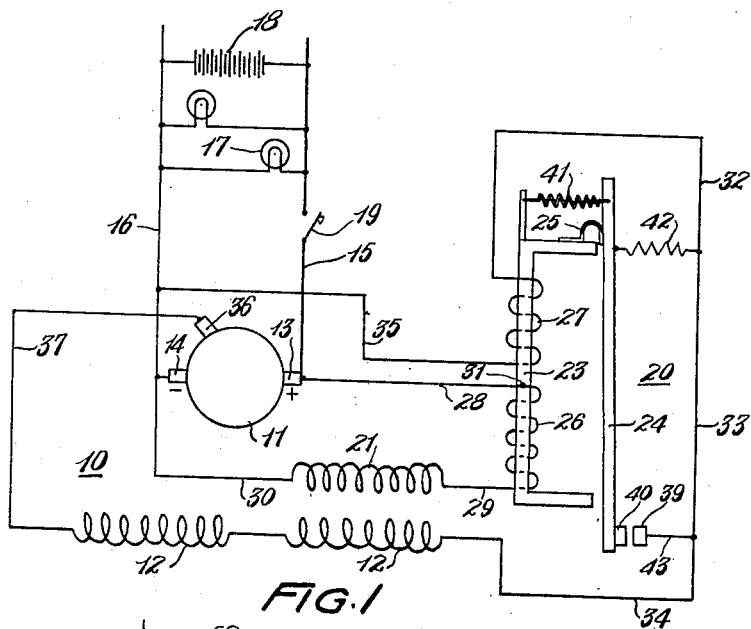
Figure 2:
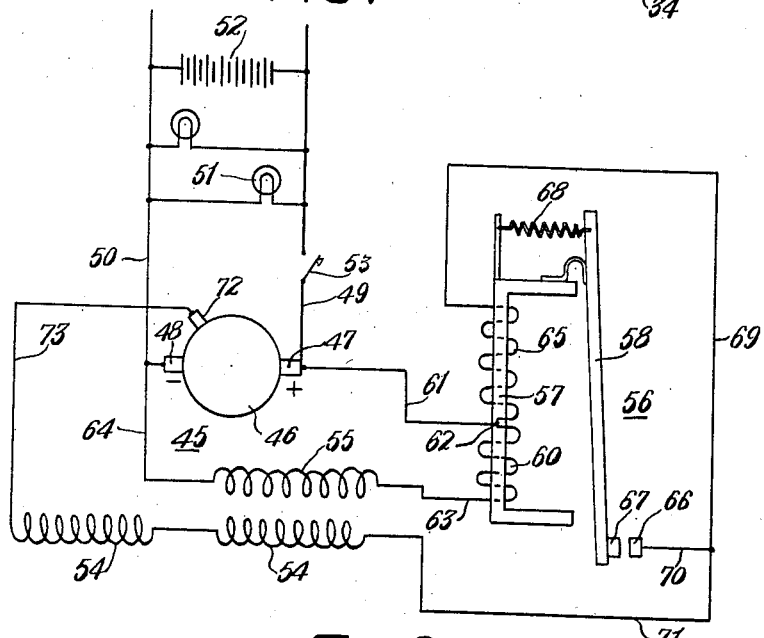

Other objects and advantages of this invention will be apparent from the following description when taken in conjunction with the accompanying sheet of drawing, wherein Fig. 1 is a diagram of a generating system embodying my novel regulating means, and Fig. 2 is a similar diagram showing my novel regulating means embodied in another generating system.

Detailed reference will now be made to the accompanying drawing, which illustrates the application of my improved regulating means to electrical generators, and although this regulating means may be embodied in various types of generating systems, it is especially applicable to variable speed variable load generators of the type commonly used for vehicle lighting and battery charging purposes.

In disclosing my invention I have shown my novel regulating means as applied to a generator of the third brush type, which is a type of generator extensively used in motor vehicle systems, but it should be understood that this is illustrative only, and that my regulating means may also be applied to the conventional two-brush generator and to generators being used for various purposes.

In general, the regulating means of my invention involves the use of an auxiliary coil which is energized in magnetically opposed or bucking relation to the main field of a generator, and a vibratory device which is energized from the generator and which cooperates with the auxiliary coil in varying the ampere turns of the main field. As will be explained more fully hereinafter, the action of the auxiliary winding, combined with the action of the vibratory device, produces a very effective regulating function which maintains the terminal voltage of the generator substantially constant, even though the speed or load of the generator may be varied within relatively wide limits.

In the regulating arrangement illustrated in Fig. 1 of the drawing I show a generator 10, having an armature 11 and a shunt field composed of one or more coils 12. In this instance I show the shunt field as comprising two of the coils 12, but it will be understood, of course, that any number of such field coils may be employed depending upon the number of field poles that there may be in the generator. The generator 10 is also provided with main brushes 13 and 14 to which load conductors 15 and 16 may be connected, respectively, for supplying the generated current to one or more incandescent lamps 17, to a storage battery 18 or to any other electrical apparatus. If desired, a main circuit control device, such as a simple switch 19 or a reverse current cut-out of the prior art, may be provided in one of the load conductors.

My improved regulating means is shown in the drawing as being operatively connected with the generator 10, and, in general, comprises a vibratory contact device 20, and an auxiliary field winding 21 which is in magnetically opposed relation to the main shunt field. In the present arrangement I have shown the auxiliary demagnetizing or bucking winding 21 as being disposed adjacent one of the shunt field coils 12, but it will be understood, of course, that the particular arrangement of this coil with respect to the main field, will be determined to some extent by manufacturing problems and the structural features of the generator being constructed. In some instances this auxiliary winding may be placed entirely on one field pole, and in other cases it may be divided and sections thereof placed on some or all of the field poles of the generator.

The vibratory device 20 comprises an electromagnet having a suitable frame 23, and a vibratory armature 24 which is movably supported on the frame by means of an electrical conducting hinge or spring connector 25. The electromagnet of the vibratory device is provided with a plurality of magnet coils 26 and 27, which are arranged on the frame 23 in additive relation to each other. The coil 26 is a voltage coil which, according to my invention, is connected across the main brushes 13 and 14 of the generator in series with the auxiliary winding 21. One end of the coil 26 is connected to the main brush 13 by means of a conductor 28, and the other end is connected to the main brush 14, through the auxiliary winding 21, by means of the conductors 29 and 30. The conductor 28 also connects the frame 23 of the vibratory device with the brush 13, by reason of this conductor being grounded on the frame as indicated at 31.

The coil 27 may, for convenience, be referred to as the operating coil and, as shown in the drawing is arranged in series with the main field by having one end thereof connected to the main field coils 12 by means of the conductors 32, 33 and 34. The other end of the operating coil is connected to the main brush 14 through a conductor 35 and through a portion of the load conductor 16. The other end of the main shunt field is connected to the third brush 36 of the generator by conductor 37.

The vibratory contact device 20 is also provided with a pair of cooperating contacts 39 and 40, the contact 39 being a stationary contact and the contact 40 being a movable contact which is carried by the armature 24. The contact 40 is normally biased toward engagement with the contact 39 by means of a suitable spring 41 acting on the armature 24. A resistance element 42 of suitable value is arranged to be short-circuited by the contacts 39 and 40, by having one end thereof connected to the armature 24, and the other end connected to the contact 39 through the conductor 33 and the conductor 43.

From the arrangement just described, it will be seen that while the generator is being operated the magnet coil 26 and the auxiliary field winding 21 will be continuously energized from the main brushes 13 and 14, and the energization of these windings will be directly responsive to variations produced in the terminal voltage of the generator due to speed changes or other causes.

When the generator is first started up the contacts 39 and 40 are in closed relation and the resistance 42 is then short-circuited. During the time that the resistance 42 is short-circuited by the contacts 39 and 40, a relatively large flow of field current takes place through the main field coils 12 and provides a strong field flux which causes the terminal voltage of the generator to build up rapidly. The field circuit may be traced at this time from the brush 13, through conductor 28 to the frame 23 of the regulator. From the frame 23 the circuit continues through the connector 25, the vibratory armature 24, the contacts 40 and 39 and then through conductors 43 and 34 to the field coils 12, and thence to the third brush 36 through conductor 37.

While the main field flux is thus building up, the operating coil 27 is also being energized from the generator to build up the flux in the frame 23. The energizing circuit for the coil 27 may be traced at this time from main brush 13, through conductor 28 to the frame 23, and then through armature 24, contacts 40 and 39 and through conductors 33 and 32 to one end of the coil 27. The circuit then continues through coil 27 and back to the main brush 14 through conductor 35 and load conductor 16. When the terminal voltage of the generator has built up sufficiently to cause the armature 24 to be attracted by the flux produced in the frame 23 by the coils 26 and 27, the contacts 40 and 39 are opened against the action of the spring 41 thereby inserting the resistance 42 into the circuit of the main field coils and also into the circuit of the operating coil 27. This causes a sudden reduction in the ampere turns of the main field and also causes a reduction in the ampere turns of the operating coil 27. This change in the ampere turns of the main field and in the operating coil 27, combined with the demagnetizing effect of the auxiliary winding 21, causes the terminal voltage of the generator to be reduced and this, in turn, results in a decrease in the magnetic attraction on the armature 24, whereupon the contacts 40 and 39 are closed by the spring 41 and the resistance 42 is thereby short-circuited out of the circuit of the field and out of the circuit of the coil 27. This allows the magnetism of the main field and the terminal voltage of the generator to again build up with a corresponding building up of the magnetism produced by the coil 27, as explained above.

From the arrangement and operation as just explained, it will be seen that the resistance element 42 is common to the energizing circuits for the operating coil 27 and the main field coils 12, and when this resistance is intermittently inserted into these circuits by the opening of the contacts 39 and 40, a desired sudden collapsing of the magnetism of the frame 23 and of the main field is obtained. The collapsing of the magnetism of the main field is further accelerated by the bucking action of the auxiliary winding 21.

It will be understood, of course, that during the operation of the regulator the armature 24 is vibrated at a very rapid rate, and from the circuit arrangement explained above it will be seen that the cooperating contacts 39 and 40 only act to intermittently short-circuit the resistance 42 and thus since only a small flow of current traverses these contacts very little destructive sparking takes place.

In Fig. 2 of the drawing I have shown a generating system similar to that illustrated in Fig. 1, but wherein the regulating means of my invention has been simplified to some extent. In this system I show a generator 45, having an armature 46 and main brushes 47 and 48. Load conductors 49 and 50 are connected, respectively, to the main brushes 47 and 48 for supplying current to the incandescent lamps 51, to the storage battery 52, and to any other electrical apparatus. A control device, such as a switch 53 or a reverse current cut-out of the prior art may be provided in the load conductor 49. The generator is also provided with main field coils 54, constituting a shunt field, and with an auxiliary field winding 55 disposed in magnetically opposed relation to the main field.

A vibratory regulating device 56 is connected with the generator and cooperates with the auxiliary winding 55 to control the excitation of the main field of the generator. This vibratory device comprises a magnet having a frame 57, and a vibratory armature 58 mounted on the latter. A coil 60 is provided on the magnet frame and is connected across the main brushes 47 and 48 of the generator in series with the auxiliary winding 55. As shown in the drawing, one end of the coil 60 is connected to the main brush 47 by a conductor 61, which is also grounded on the frame 57 as indicated at 62, and the other end of the coil is connected to the main brush 48 through the auxiliary winding 55 and through conductors 63 and 64. A second coil 65 is provided on the magnet frame 57 and is an inductive resistance arranged to magnetically oppose the coil 60. For a purpose to be presently explained, the vibratory device 56 is also provided with cooperating contacts 66 and 67, the contact 66 being a stationary contact and the contact 67 being carried by the armature 58 and normally biased toward engagement with the contact 66 by means of the spring 68. One end of the magnet coil 65 is connected to the frame 57 at the point 62, and the other end of this coil is connected to the contact 66 by means of the conductors 69 and 70. The contact 66 is also connected to the main field coils 54 by a conductor 71, and the main field coils are, in turn, connected to the third brush 72 by means of a conductor 73.

In the operation of the regulating arrangement of Fig. 2, it will be seen that when the generator is started up the contacts 66 and 67 are in closed relation and the inductive resistance 65 is then short-circuited out of the main field circuit. At this time the circuit of the main field may be traced from the brush 47, through conductor 61 to the frame 57, and then through armature 58, contacts 66 and 67 and conductors 70 and 71 to the main field coils 54 and thence to main brush 72 through the conductor 73. After the terminal voltage of the generator has built up and the magnet coil 60 has been sufficiently energized to cause the armature 58 to be attracted, the contacts 66 and 67 are opened and the inductive resistance 65 is thereby inserted into the main field circuit. This main field circuit can then be traced from main brush 47, through conductor 61 to the frame 57, and then through inductive resistance 65 and conductors 69 and 71 to the main field coils 54 and thence to a third brush 72 through the conductor 73. The flow of field current through the inductive resistance 65 induces magnetism in the frame 57 in opposition to the magnetism produced by the coil 60 to thereby lessen the attraction on the armature 58. At the same time the resistance 65 being connected to the main field circuit cooperates with the bucking auxiliary winding 55 to rapidly reduce the excitation of the main field. These actions result in the attraction of the armature 58 being reduced sufficiently to permit the contacts 66 and 67 to be closed by the spring 68, and this short-circuits the resistance 65 out of the main field circuit, allowing the terminal voltage of the generator to again build up in the manner already explained.

From the regulating arrangements disclosed it will be seen that I have provided a very simple and extremely efficient regulating means, whereby the terminal voltage of a generator is maintained substantially constant, even though the speed and load of the generator may be subjected to wide fluctuations. It will also be seen from the regulating arrangements disclosed that I obtain this efficient regulating function by a combination of the demagnetizing action of an auxiliary field winding and the action of the vibratory contact device. In the operation of my improved regulating apparatus this combined action causes a sudden collapse of the field flux and also a sudden collapse of the flux of the vibratory regulator and this results in a desired extremely rapid rate of vibration being obtained in the vibratory contact device. It will be seen further that by reason of the circuit arrangements employed, only a small flow of current traverses the cooperating contacts, with the result that there is very little destructive sparking and the contacts remain in a serviceable and efficient condition throughout a long period of use.

While I have illustrated and described the improved regulating means of my invention in a detailed manner, it should be understood, of course, that I do not wish to be limited to the precise details of construction and circuit arrangements illustrated and described, but regard my invention as including such changes and modifications as do not involve a departure from the spirit of the invention and the scope of the appended claims.

Having thus described my invention I claim:
1. In combination, a generator having a main field, an auxiliary field winding opposing said main field, and a regulator having a plurality of magnet coils energized from said generator and vibratory means responsive to said coils for varying the ampere turns of said main field, one of the magnet coils being in the circuit of the auxiliary field winding and another of said coils being in a circuit which is affected by the operation of said vibratory means.

2. In combination a generator having a main shunt field, an auxiliary field winding magnetically opposing the main field, an electromagnet having a plurality of magnet coils energized from the generator, vibratory contact means adapted to be actuated by said magnet coils, one of said magnet coils being a voltage coil in series with the auxiliary field winding, and circuit connections controlled by said vibratory contact means for varying the ampere turns of the other magnet coil and of the main field.

3. In combination, a generator having a main field, an auxiliary field winding opposing said main field, a magnet having a plurality of coils energized from the generator, one of said magnet coils being in the circuit of said auxiliary winding, vibratory contact means responsive to said magnet coils, and circuit connections controlled by said vibratory means for varying the ampere turns of the main field and of another of said magnet coils.

4. In combination, a generator having a main field, an auxiliary field winding opposing said main field, a magnet having a plurality of coils energized from the generator, one of said magnet coils being in the circuit of said auxiliary winding, vibratory contact means responsive to said magnet coils, a resistance common to the main field circuit and to the circuit of another of said magnet coils, and circuit connections controlled by said vibratory means for intermittently short-circuiting said resistance.

5. In combination a generator having a main shunt field, an auxiliary shunt field winding magnetically opposing the main field, and a regulator for maintaining the terminal voltage of the generator substantially constant, said regulator comprising a magnet coil in series with the auxiliary shunt field winding, a second magnet coil additive to the series magnet coil and energized from the generator, a member adapted to be vibrated by the magnet, cooperating contacts adapted to be opened and closed by said vibratory member, and circuit connections controlled by said contacts for varying the ampere turns of said main shunt field.

6. In combination, a generator having a main shunt field, an auxiliary field winding magnetically opposing said main field, and a regulator for varying the excitation of the main shunt field, said regulator comprising a magnet having a coil in series with the auxiliary field winding, an inductive resistance in the circuit of the main field and magnetically opposing said series coil, and contact means for short-circuiting said inductive resistance.

7. In combination, a generator having a main shunt field, an auxiliary shunt field winding magnetically opposing said main field, and a regulator having operative connection with the generator, said regulator comprising a magnet having a coil in series with said auxiliary shunt field coil, an inductive resistance in the circuit of the main field and magnetically opposing the series magnet coil, and vibratory contact means actuated by the series coil for intermittently short-circuiting said inductive resistance.

BENNETT M. LEECE.